United States Patent [19]

Lace

[11] Patent Number: 4,878,145
[45] Date of Patent: Oct. 31, 1989

[54] SURGE/TRANSIENT PROTECTOR FOR A PLURALITY OF DATA LINES

[75] Inventor: Melvin A. Lace, Prospect Height, Ill.

[73] Assignee: Oneac Corporation, Libertyville, Ill.

[21] Appl. No.: 273,595

[22] Filed: Nov. 21, 1988

[51] Int. Cl.$^4$ .............................................. H02H 3/22
[52] U.S. Cl. ..................................... 361/118; 361/56; 361/119
[58] Field of Search ...................... 361/54, 56, 91, 111, 361/117, 118, 119; 379/392, 412, 428, 443

[56] References Cited

U.S. PATENT DOCUMENTS

| | | | |
|---|---|---|---|
| 4,050,092 | 9/1977 | Simokat | 361/56 |
| 4,156,755 | 3/1979 | Causse | 179/98 |
| 4,161,008 | 7/1979 | Zimmermann et al. | 361/56 |
| 4,259,705 | 3/1981 | Stifter | 361/56 |
| 4,271,446 | 6/1981 | Comstock | 361/56 |
| 4,438,477 | 3/1984 | Cawley | 361/119 |
| 4,449,157 | 5/1984 | Chow | 361/56 |
| 4,504,883 | 3/1985 | Uchida et al. | 361/119 |
| 4,616,288 | 10/1986 | Scholtholt et al. | 361/119 |
| 4,675,772 | 1/1987 | Epstein | 361/56 |
| 4,692,833 | 9/1987 | Chung | 361/91 |
| 4,695,916 | 9/1987 | Satoh et al. | 361/56 |
| 4,758,920 | 7/1988 | McCartney | 361/119 |
| 4,807,083 | 2/1989 | Austin | 361/118 X |

Primary Examiner—William M. Shoop, Jr.
Assistant Examiner—A. Jonathan Wysocki
Attorney, Agent, or Firm—Kinzer, Plyer, Dorn, McEachran & Jambor

[57] ABSTRACT

A surge/transient protector for an N-line data cable (e.g., N=16) or other group of N data lines having two data conductors and a return conductor for each line includes individual conductor segments for each data line conductor; conventional multi-pin connectors are used to connect the protector in series in the lines. The protector has a positive bus, a negative bus, and a ground bus; each data conductor segment is coupled by a pair of oppositely polarized diodes to the positive and negative buses, and each return conductor is coupled to the reference bus by two oppositely connected diodes. Two large capacity energy storage devices (e.g. 10,000 microfarad capacitors) are connected between the reference bus and the positive and negative buses, each paralleled by a Zener diode to establish a discharging threshold just slightly greater than one-half the voltage range for the data lines. There are also N gas tubes, each connected between two data conductor segments and ground, and N supplemental energy storage devices, which may be metal oxide varistors functioning as large, threshold-limited capacitors; all of the protector apparatus, including a power supply, is mounted in one compact housing, with the two large-capacity energy storage devices serving all of the data lines.

20 Claims, 1 Drawing Sheet

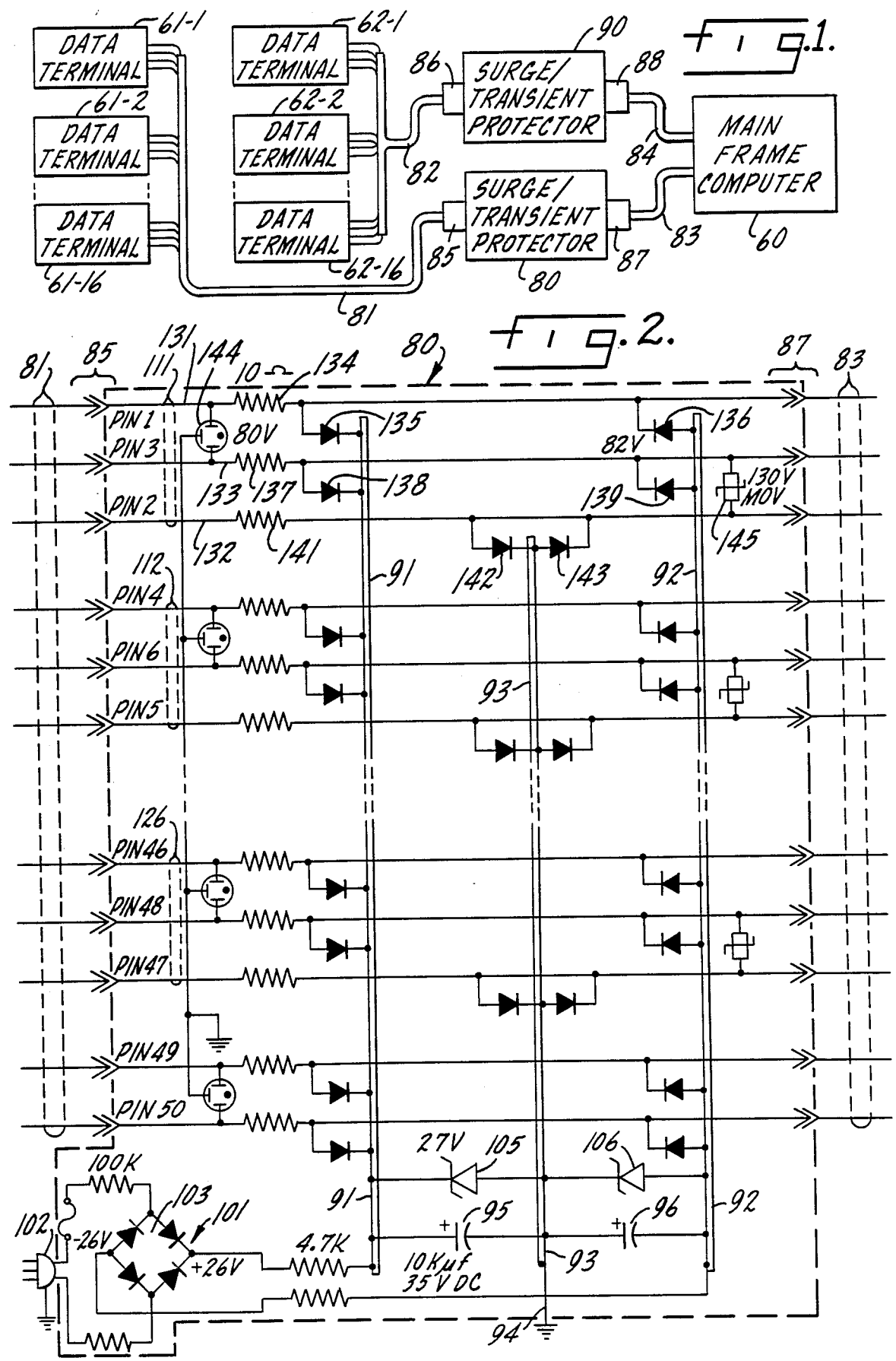

SURGE/TRANSIENT PROTECTOR FOR A PLURALITY OF DATA LINES

BACKGROUND OF THE INVENTION

At a mainframe computer or other data processing center of substantial size there are usually one or more data cables, converging on the data processing center from a plurality of peripheral stations. A typical cable may contain sixteen data lines, each data line including two data conductors and a return conductor; the same cable usually includes two ground lines, so that a conventional fifty pin connector serves to connect the cable to the computer. Of course, other cable sizes employing different connectors (e.g., twenty-five or one hundred pins) are also employed in essentially the same way. In any such data system there is a preselected voltage range for transmission of data on the data conductors, usually balanced with respect to the return conductor; a typical range is fifty volts, twenty-five volts of each polarity relative to ground.

Any voltage outside the preselected data voltage range, on any of the conductors, may cause physical damage to the computer, to the peripheral stations, or to the cable, in addition to interfering with the data transmission. This problem applies to very brief voltage transients as well as to voltage surges of appreciable duration; any and all overvoltage surges and transients may be quite deleterious. Thus, the cable, or separate data lines, and particularly the computer or other data processing equipment, need protection against overvoltage surges of any origin. That is the aim of the present invention.

SUMMARY OF THE INVENTION

It is a principal object of the invention, therefore, to provide a new and improved apparatus for protecting N plural-conductor data lines, and a computer or other data processing equipment connected to those lines, against voltage surges or transient voltages that exceed a preselected data voltage range, all of the apparatus being mounted in a compact, unitary housing.

Another object of the invention is to provide a new and improved surge/transient protector for N plural-conductor data lines that is compact, simple, and economical in construction, yet durable and dependable in operation.

Accordingly, the invention relates to a surge/transient protector for protecting a plurality of N data lines, grouped together at a given location, on which lines data are transmitted within a given data voltage range, each data line comprising fist and second data conductors and a return conductor; the protector comprises N data line segments each including first and second data conductor segments and a return conductor segment, first and second conductor means for connecting each of the N data line segments in series in one of the N data lines, a positive bus, a negative bus, and a reference bus, and grounding means for connecting the reference bus to a plane of common potential. First unidirectional coupling means are provided for coupling each data conductor segment to the positive bus, with second unidirectional coupling means for coupling each data conductor segment to the negative bus, and bi-directional return coupling means for coupling each return conductor segment to the reference bus. A first large transient/surge energy storage device is connected between the positive bus and the reference bus, having a positive threshold potential slightly larger than one-half the data voltage range; a second large transient/surge energy storage device is connected between the negative bus and the reference bus, having a negative threshold potential approximately equal to the positive threshold potential. N discharge devices are each connected to the plane of reference potential and to the first and second data conductors in one data line segment, the discharge devices having a breakdown potential much higher than the data voltage range. A unitary housing encompasses all of the surge/transient protector components as set forth above.

BRIEF DESCRIPTION OF THE DRAWINGS

FIG. 1 is a block diagram illustrating the use of surge/transient protectors constructed in accordance with the present invention; and FIG. 2 is a schematic diagram of a surge/transient protector according to one embodiment of the invention.

DESCRIPTION OF THE PREFERRED EMBODIMENT

FIG. 1 is a general illustration of a typical environment in which a surge/transient protector device constructed in accordance with the present invention is employed. FIG. 1 shows a mainframe computer 60 that is connected to a multiplicity of data terminals or work stations. Each data terminal in one series 61-1 through 61-16 is connected to a communication cable 81. Each data terminal is shown as having four conductors connected to the cable. These conductors usually include first and second data conductors, a return conductor, and a reference or ground conductor. Each such set of conductors constitutes a data line. However, not all of the conductors continue individually through cable 81; cable 81 may contain only one or two ground conductors serving all of the data lines in the cable.

FIG. 1 shows another series of data terminals 62-1 through 62-16; these data terminals are all connected to mainframe computer 60 by means of a cable 82. Again, each data line for each data terminal includes two data conductors and a return conductor; reference or ground conductors may also be provided. Other cables (not shown) may be utilized to connect additional data terminals or work stations to mainframe computer 60.

Two surge/transient protector devices 80 and 90 are shown in FIG. 1, each connected in series with one of the cables 81 and 82 that supply data to and transmit data from mainframe computer 60. Thus, protector 80 is interposed in series between cable 81 and another cable 83 that is a continuation of cable 81 and connects directly to computer 60. Similarly, a cable 84 extends the data lines of cable 82 to computer 60, with the surge/transient protector 90 interposed in series. The same arrangement would apply to any additional cables. As will be apparent from the description hereafter, protectors 80 and 90 could be constructed as a single device. The illustrated arrangement, with one protector circuit for each cable, however, is usually more flexible and more economical.

In conventional construction, each of the cables 81, 82, etc., is likely to include sixteen data lines, with each line comprising three conductors (two data conductors and a return). The data conductors are sometimes called a transmit conductor and a receive conductor. In addition, in a conventional cable there would be two ground conductors for a total of fifty conductors in the cable. Thus, conventional fifty pin connectors may be used to connect each cable to apparatus such as the mainframe computer 60. In the arrangement illustrated in FIG. 1, two connectors 85 and 87 connect protector 80 to cables 81 and 83, whereas two other connectors 86 and 88 connect cables 82 and 84 to the other protector 90.

A preferred embodiment of surge/transient protector 80 affording a simple and economical structure for protecting all of the data lines in cable 81 against the effects of lightning, overvoltage surges, and other similar occurrences, is illustrated schematically in FIG. 2. Dash outline 80 represents the housing of the protector unit. Protector 90, FIG. 1, may incorporate the same construction.

Protector 80, FIG. 2, includes a first or positive bus 91, a second or negative bus 92, and a reference bus 93 having an appropriate connection 94 to ground. As seen at the bottom of FIG. 2, a first transient/surge suppressor comprising a large charge storage device, the capacitor 95, is connected between positive bus 91 and reference bus 93. A voltage threshold regulation device 105 is connected in parallel with capacitor 95; device 105 is preferably a silicon avalanche Zener diode. Other devices may be used for regulation of the discharge voltage for capacitor 95, including other semiconductor avalanche diodes and varistors. Regardless of the type, device 105 should have a breakdown (threshold) voltage slightly greater than one-half the overall data voltage range for the data lines of cable 81 that are to be protected by circuit 90. As an example, the data transmission range for the system shown in FIGS. 1 and 2 may be taken as plus and minus twenty-five volts. As indicated in FIG. 2, in these circumstances the threshold voltage for regulator 105, and hence for discharge of capacitor 95, may be higher, up to about thirty-five volts as a maximum, but preferably is no more than a few volts in excess of one-half the overall data voltage range.

A second transient/surge charge storage device 96 is connected between negative bus 92 and ground bus 93. Device 96 should be matched with capacitor 95 so that two charge storage devices have the same operating characteristics. A threshold voltage regulator 106, matched to Zener diode 105, is connected in parallel with capacitor 96. Preferably, the two storage devices 95 and 96 are large capacitors; e.g., 10,000 microfarads. The DC voltage ratings of these capacitors should be greater than the breakdown voltage of devices 105 and 106. Thus, assuming that devices 105 and 106 are Zener avalanche diodes rated at twenty-seven volts for breakdown, the DC voltage ratings of capacitors 95 and 96 may be thirty-five volts.

A power supply 101 energized through a conventional plug connector 102 connected to an external AC power source (not shown) is provided for buses 91–93 in protector circuit 90. As shown, power supply 101 includes a bridge circuit 103 having its input terminals connected to plug 102. The positive and negative output terminals of bridge 103 are connected to positive bus 91 and negative bus 92, respectively. Plug 102 includes a ground connection so that the output voltage from power supply 101 is balanced in its application to buses 91 and 92, relative to ground bus 93. Power supply 101 may be replaced by other power supply arrangements, such as a pair of batteries, one connected between buses 91 and 93 and the other between buses 92 and 93. In some instances, power supply 101 may even be omitted.

The mainframe data line protector 80 includes coupling means for coupling all of the conductors in each data line of cable 81 to both the positive and negative buses 91 and 92. FIG. 2 shows the coupling arrangements for three data lines 111, 112, and 126, which are assumed to be the first two lines and the last line from a sixteen line cable 81. For data line 111, there is a first (positive) data conductor segment 131, a second data (negative or receive) conductor segment 133, and a return conductor segment 132. A current-limiting resistor 134 is in series with the first data conductor segment 131; conductor segment 131 is coupled to positive bus 91 by a diode 135 and is coupled to negative bus 92 by an oppositely-polarized diode 136. Typically, resistor 134 may be ten ohms; diodes 135 and 136 may be suppressor diodes rated at eighty-two volts. The second data conductor segment 133 for line 111, which includes a series current limiting resistor 137, is coupled to positive bus 91 by a diode 138 and to negative bus 92 by a diode 139. The return conductor segment 132 for data line 111, in which a current limiting resistor 141 is interposed, is coupled to ground bus 93 by two oppositely polarized diodes 142 and 143. Resistors 134, 137 and 141 should all have the same impedance and voltage rating; diodes 135, 136, 138, 139, 142, and 143 should all be matched to each other. Series IN4000 diodes are suitable.

Two additional protective devices are provided for data line 111, in the circuit arrangement of FIG. 2. One is a three-electrode gas discharge tube 144 that has two electrodes connected to the two data conductor segments 131 and 133 at the side of circuit 80 to which cable 81 is connected by connector 85. The third electrode of tube 144 is connected to ground. Typically, for a system having a data voltage range of fifty volts, the breakdown voltage for gas tube 144 may be eighty volts. The other protective device for line 111 is sown as a metal oxide varistor (MOV) 145 connected from data conductor 133 to return conductor 132 at the side of protector circuit 80 that is connected to cable 83 by connector 87. Actually, MOV 145 functions, in protector 80, as if it were a large capacitor or other such storage device. The breakdown voltage for device 145 should be substantially higher than that of any of the other protector elements in circuit 80, well beyond the anticipated range of voltages on the lines of cable 81. In the illustrated system, functioning within the parameters given above, the breakdown rating for MOV 145 may be one hundred thirty volts.

Positive-polarity surges and transient on conductor segment 131, from voltages occurring on the corresponding data conductor in cable 81, are usually diverted to positive bus 91 through diode 135 and are effectively dissipated by charging of capacitor 95. Any excess charge on device 95 is ultimately discharged to ground through diode 105. Negative-polarity surges on conductor segment 131 are disposed of similarly through diode 136 and bus 92, and are absorbed by capacitor 96, regulated by diode 106. For data conductor segment 133 of line 111 the process is similar; positive-going line surges are usually diverted to bus 91 via diode 138 and are dissipated by charging of capacitor 85, whereas negative polarity transients traverse diode 139 to bus 92 and are spent charging capacitor 96.

Typically, for a system having a data voltage range of fifty volts, the breakdown voltage for gas tube 144 may be eighty volts. The other protective device for line 111 is shown as a metal oxide varistor (MOV) 145 connected from data conductor 133 to return conductor 132 at the side of protector circuit 80 that is connected to cable 83 by connector 87. Actually, MOV 145 functions, in protector 80, as if it were a large capacitor or other such storage device. The breakdown voltage for device 145 should be substantially higher than that of any of the other protector elements in circuit 80, well beyond the anticipated range of voltages on the lines of cable 81. In the illustrated system, functioning within the parameters given above, the breakdown rating for MOV 145 may be one hundred thirty volts.

Positive-polarity surges and transients on conductor segment 131, from voltages occurring on the corresponding data conductor in cable 81, are usually diverted to positive bus 91 through diode 135 and are effectively dissipated by charging of capacitor 95. Any excess charge on device 95 is ultimately discharged to ground through diode 105. Negative-polarity surges on conductor segment 131 are disposed of similarly through diode 136 and bus 92, and are absorbed by capacitor 96, regulated by diode 106. For data conductor segment 133 of line 111 the process is similar; positive-going line surges are usually diverted to bus 91 via diode 138 and are dissipated by charging of capacitor 95, whereas negative polarity transients traverse diode 139 to bus 92 and are spent charging capacitor 96. Transients on return line segment 132, on the other hand, are coupled directly to ground bus 93 through one of the diodes 142, 143, depending on the polarity of the transients. In all of these functions, resistors 134, 137 and 141 serve to limit the currents developed by the surges.

For transients on line segments 131 and 133, at voltages exceeding the breakdown rating for gas tube 144 (eighty volts), the gas tube is driven conductive. This effectively increases the capacity of protector 80 for such surges, affording two paths from the affected data conductor segments to ground. A further line of defense, for high-power surges on the conductor segments of line 111 in protector 80, is the very large, high-voltage-rated capacitance afforded by MOV 145, which can absorb substantial power and serves to protect cable 83 and mainframe computer 60 in surge situations such as may be created by lightning or other violent electrical occurrences in the vicinity of cable 83 and mainframe computer 60 in surge situations such as may be created by lightning or other violent electrical occurrences in the vicinity of cable 81 or of one of the data lines connected to the cable.

As will be apparent from FIG. 2, the circuitry in protector 80 that protects lines 112 and 126 of cables 81 and 83 (and computer 60) against transients and other surges is the same as described above for line 111. Thus, for each of the sixteen data lines traversing protector 80, there is a three-electrode discharge device coupling the data conductor segments to ground, for voltages exceeding eighty volts, ahead of a small current-limiting resistor in each data conductor segment. The return conductor segment in each line also includes a small current-limiting resistor. The two data conductor segments are each connected to the busses 91 and 92 by a pair of oppositely polarized diodes; the return conductor segment is coupled to bus 93 by two oppositely polarized diodes. Thus, the large storage devices, capacitors 95 and 96, their threshold devices 105 and 106, and power supply 101 all serve all of the data lines. And each data line has its backup protection from a further energy storage device corresponding to the MOV 145 connected between conductor segments 132 and 133 in line 111.

From the foregoing description, it will be apparent that in protector 80 the energy storage capacitors 95 and 96, with their respective threshold establishing voltage regulator devices 105 and 106, each serve all of the data conductor segments in all of the lines that pass through the protector. This makes it convenient and practical to put the entire protector 80, including all of its components as shown in FIG. 2, into a small, unitary housing. Indeed, the commercial version of protector 80, the model DLP-50 protector of Oneac Corporation, serving a sixteen-line cable, fits into a housing approximately 7×12×3 inches (17×30×7.5 cm). Of course, this compact construction is also made possible because for each data line the protector requires just three small current-limiting resistors, six very small diodes, a gas discharge tube about the size of a peanut, and a varistor even smaller than the gas tube.

In some applications a group of data lines may be brought together at a mainframe computer or other central location without prior collection into a cable. For situations of this sort, of course, it is only necessary to provide appropriate connectors to connect the data lines to a protector like apparatus 80, which is not dependent upon amalgamation of the lines into a cable. Regardless of cable arrangements, apparatus 80 affords superior surge/transient protection in a construction that is simple, inexpensive, durable, and usually compact. Thus, protector 80, as described and illustrated, has been demonstrated to conform to the requirements of ANSI/IEEE specification C62.41, category B, 6,000 V/500 A, 0.5 microsecond, 100 KHz decay, maintaining the transient output at or below forty volts. The protector does not load the data line.

I claim:

1. A surge/transient protector for protecting a plurality of N data lines, grouped together at a given location, on which lines data are transmitted within a given data voltage range, each data line comprising first and second data conductors and a return conductor, the protector comprising:

N data line segments each including first and second data conductor segments and a return conductor segment;

first and second connector means for connecting each of the N data line segments in series in one of the N data lines;

a positive bus, a negative bus, and a reference bus;

grounding means for connecting the reference bus to a plane of common potential;

first unidirectional coupling means coupling each data conductor segment to the positive bus;

second unidirectional coupling means coupling each data conductor segment to the negative bus;

bi-directional return coupling means coupling each return conductor segment to the reference bus;

a first large transient/surge energy storage device, connected between the positive bus and the reference bus, and having a positive threshold potential slightly larger than one-half the data voltage range;

a second large transient/surge energy storage device, connected between the negative bus and the reference bus, and having a negative threshold potential approximately equal to the positive threshold potential; and N discharge devices, each connected to the plane of reference potential and to the first and second data conductors in one data line segment, the discharge devices having a breakdown potential much higher than the data voltage range.

2. A surge/transient protector for a group of N data lines, according to claim 1, in which each coupling means comprises a pair of diodes, and further comprising:

3N current limiting resistors, each connected in series with one of the conductor segments.

3. A surge/transient protector for a group of N data lines, according to claim 1, and further comprising:

N supplemental transient/surge energy storage devices, each connected between the return segment and one of the data conductor segments for one data line, each supplemental energy storage device having a threshold voltage of at least twice the data voltage range.

4. A surge/transient protector for a group of N data lines, according to claim 3, in which each supplemental energy storage device is a metal oxide varistor, and in which each coupling means comprises a pair of diodes.

5. A surge/transient protector for a group of N data lines, according to claim 1, and further comprising:

power supply means for generating a positive bias potential, above the reference plane, greater than one-half the data voltage range but smaller than the positive threshold potential, and for generating a negative bias potential, below the reference plane, having an amplitude equal to the positive bias potential;

and bias connecting means for connecting the positive bias potential to the positive bus and the negative bias potential to the negative bus.

6. A surge/transient protector for a group of N data lines, according to claim 1, in which each primary and secondary transient/surge energy storage device is a capacitor connected in parallel with a semiconductor voltage threshold regulator.

7. A surge/transient protector for a group of N data lines, according to claim 6, in which each voltage threshold regulator is an avalanche Zener diode.

8. A surge/transient protector for a group of N data lines, according to claim 6, in which each voltage threshold regulator is a varistor.

9. A surge/transient protector for a group of N data lines, according to claim 6, and further comprising:

N supplemental transient/surge energy storage devices, each connected between the return segment and one of the data conductor segments for one data line, each supplemental energy storage device having a threshold voltage of at least twice the data voltage range.

10. A surge/transient protector for a group of N data lines, according to claim 9, in which each coupling means comprises a pair of diodes.

11. A surge/transient protector for a group of N data lines, according to claim 9, and further comprising:

power supply means for generating a positive bias potential, above the reference plane, greater than one-half the data voltage range but smaller than the positive threshold potential, and for generating a negative bias potential, below the reference plane, having an amplitude equal to the positive bias potential;

and bias coupling means for coupling the positive bias potential to the positive bus and the negative bias potential to the negative bus.

12. A surge/transient protector for a group of N data lines, according to claim 11, in which each coupling means comprises a pair of diodes.

13. A surge/transient protector for a group of N data lines, according to claim 6, and further comprising:

power supply means for generating a positive bias potential, above the reference plane, greater than one-half the data voltage range but smaller than the positive threshold potential, and for generating a negative bias potential, below the reference plane, having an amplitude equal to the positive bias potential;

and bias coupling means for coupling the positive bias potential to the positive bus and the negative bias potential to the negative bus.

14. A surge/transient protector for a group of N data lines, according to claim 3, and further comprising:

power supply means for generating a positive bias potential, above the reference plane, greater than one-half the data voltage range but smaller than the positive threshold potential, and for generating a negative bias potential, below the reference plane, having an amplitude equal to the positive bias potential;

and bias coupling means for coupling the positive bias potential to the positive bus and the negative bias potential to the negative bus.

15. A surge/transient protector for a group of N data lines, according to claim 14, in which each coupling means comprises a pair of diodes.

16. A surge/transient protector for a group of N data lines, according to claim 12, in which:

the data voltage range is fifty volts;

the positive and negative threshold potentials for the first and second storage devices are each approximately twenty-seven volts;

the breakdown potential of the discharge devices is approximately eighty volts;

the threshold voltage of the supplemental storage devices exceeds one hundred volts;

and each diode in the coupling means is a suppressor diode having a breakdown voltage exceeding eighty volts.

17. A surge/transient protector for a group of N data lines, according to claim 1, and further comprising a unitary housing encompassing all of the surge/transient protector circuit components.

18. A surge/transient protector for a group of N data lines, according to claim 17, in which each coupling means comprises a pair of diodes, and further comprising:

3N current limiting resistors, each connected in series with one of the conductor segments within the housing.

19. A surge/transient protector for a group of N data lines, according to claim 17, and further comprising:

N supplemental transient/surge energy storage devices, mounted within the housing and each connected between the return segment and one of the data conductor segments for one data line, each supplemental energy storage device having a threshold voltage of at least twice the data voltage range.

20. A surge/transient protector for a group of N data lines, according to claim 19, in which each primary and secondary transient/surge energy storage device is a capacitor connected in parallel with a semiconductor voltage threshold regulator.

* * * * *